(12) United States Patent
Schloesser

(10) Patent No.: US 9,504,201 B2
(45) Date of Patent: Nov. 29, 2016

(54) SYNCHRONIZED SHAKER HEAD

(71) Applicant: Oxbo International Corporation, Byron, NY (US)

(72) Inventor: Christopher M Schloesser, Hudson, WI (US)

(73) Assignee: Oxbo International Corporation, Byron, NY (US)

(*) Notice: Subject to any disclaimer, the term of this patent is extended or adjusted under 35 U.S.C. 154(b) by 130 days.

(21) Appl. No.: 14/192,511

(22) Filed: Feb. 27, 2014

(65) Prior Publication Data
US 2014/0260150 A1 Sep. 18, 2014

Related U.S. Application Data

(60) Provisional application No. 61/794,039, filed on Mar. 15, 2013.

(51) Int. Cl.
*A01D 46/26* (2006.01)
*A01D 46/28* (2006.01)

(52) U.S. Cl.
CPC .............. *A01D 46/26* (2013.01); *A01D 46/28* (2013.01)

(58) Field of Classification Search
USPC .................................................. 56/330, 340.1
See application file for complete search history.

(56) References Cited

U.S. PATENT DOCUMENTS

| | | | |
|---|---|---|---|
| 3,325,984 A * | 6/1967 | Christie | A01D 46/28 56/330 |
| 3,344,591 A * | 10/1967 | Christie | A01D 46/28 56/330 |
| 4,064,683 A * | 12/1977 | Tennes | A01D 46/26 56/340.1 |
| 4,207,727 A * | 6/1980 | Poytress | A01D 46/28 56/330 |
| 4,214,427 A | 7/1980 | Bobard et al. | |
| 4,286,426 A | 9/1981 | Orlando et al. | |
| 4,336,682 A | 6/1982 | Orlando | |
| 4,418,521 A | 12/1983 | Orlando et al. | |
| 4,432,190 A | 2/1984 | Orlando | |
| 4,621,488 A | 11/1986 | Claxton | |
| 4,793,128 A | 12/1988 | Creed | |
| 5,074,108 A | 12/1991 | Claxton et al. | |
| 5,921,074 A | 7/1999 | Scott et al. | |
| 6,003,294 A | 12/1999 | Fitzgerald et al. | |

FOREIGN PATENT DOCUMENTS

| | | |
|---|---|---|
| WO | WO 98/21933 | 5/1998 |
| WO | WO 2004/110130 A1 | 12/2004 |
| WO | WO 2006/103492 A1 | 10/2006 |

OTHER PUBLICATIONS

International Search Report and Written Opinion for PCT/US2014/018970 mailed Aug. 12, 2014.

* cited by examiner

*Primary Examiner* — Alicia Torres
(74) *Attorney, Agent, or Firm* — Merchant & Gould P.C.

(57) ABSTRACT

A trunk shaker harvester includes a shaker assembly with four synchronized shaker drives. The shaker drives are mounted on a frame of trunk engagement members. The shaker drives include offset weights that are synchronized so that all are directed to the left or right side at the same time. However, the front and rear motors on each side of the drive rotate in the opposite direction so that the weights face toward or away from one another at the same time and cancel out longitudinal forces.

8 Claims, 8 Drawing Sheets

SYNCHRONIZED SHAKER HEAD

BACKGROUND OF THE INVENTION

1. Field of the Invention

The present invention is directed to a harvester and in particular to a trunk shaker harvester having a shaker head with engagement members driven by synchronized motors.

2. Description of the Prior Art

Harvesters and fruit harvesters in particular use a wide variety of configurations for dislodging fruit, nuts and other crops from the plants. A well known configuration and method utilizes trunk shakers that engage the trunk of a plant or vine to shake loose the crops to be harvested. The shaker mechanisms take on several configurations such as force balanced shakers. Although know systems such force balanced shakers are effective in removing produce, there are several drawbacks. The required mass of the weights imparts unwanted vibration and forces to the chassis. Moreover, the mounting of the weights in an overhead position moves the drive and oscillations closer to the harvester chassis and further from the trunk or vine that is actually being shaken so that more of energy from the shaking mechanisms is conveyed to harvester and less to the plants.

In addition to positioning, the use of force balanced shakers requires greater weight. The greater weight of the drive mechanism compounds design capabilities as the increased weight requires a stronger shaker frame and assembly to dampen the desired movement of the shaker. The heavier frame and assembly also requires a stronger and heavier chassis to support the larger shaker. Therefore, the entire harvester weighs more and is less efficient, may cause additional damage and may require additional considerations for layout of over the row harvesters.

It can be seen then that a new and improved shaker mechanism for an over the row harvester is needed. Such a shaker should provide for imparting an oscillation with reduced weights and with less mass. Moreover, the drive assembly should use lighter weights, requiring a lighter frame for the shaker head and a lighter frame for the harvester. The oscillation should also be electronically synchronized between the various drive assemblies to maintain synchronization. This eliminates the need for mechanical synchronization, therefore reducing the weight of the synchronization system so that less reactive force is passed from the shaker head that must be absorbed by the harvester. The shaker drives should also be mounted on or the close to the plant engagement members to convey more of the energy and forces from the shaking mechanisms to the trunks or vines being shaken. The present invention addresses these problems, as well as others associated with shaker mechanisms for over the row harvesters.

SUMMARY OF THE INVENTION

The present invention is directed to a trunk shaker apparatus and in particular to an over the row type trunk shaker with synchronized shaker drives. Over the row harvesters are utilized to drive along a row of plants, vines or trees. The harvester forms a center tunnel with a portion of the chassis passing over the row. Engagement members extend on both sides of the trunk or plant and impart a shaking motion loosening fruit, nuts or other crops that are collected and harvested.

The present invention includes a shaker assembly with ski type engagement members forming a divergent entry portion and that directs the trunk in between the left and right engagement members. Overhead arms provide support to the shaker assembly. Shaking forces are imparted by four independently driven drive assemblies. Each drive assembly includes an independently driven motor driving a rotary disc having weights offset from the center of the rotational axis. The motor speed and position are synchronized with one another so that all weights extend to the left or right side at the same time. This synchronization of the weights imparts a lateral shaking motion to the shaker assembly. The front and rear motors on each side are driven in an opposite direction. Therefore, although the left and right orientation of the weights is aligned, the front to rear position is opposite one another. Therefore, the front and rear weights extend toward one another at one intermediate position and away from one another in the opposite intermediate position. In both positions, the force of the weights offsets and is absorbed by a truss like frame structure supporting the engagement members. This allows the force required to shake the plants to be developed while decreasing the forces passed through to the chassis of the harvester. Moreover, the motors on the left and right side are synchronized but rotate in the opposite direction between the corresponding front motors and the corresponding rear motors. Therefore, although all four drive assemblies have the weights extending toward the left side or right side at the same time, while the left side weights extend toward one another, the right side weights extend away from one another and vice versa. This provides further balance to the shaker mechanism and lessens vibration forces passed through to the chassis.

The drive assemblies are mounted on a frame attached to the engagement member rather than on overhead support arms or elsewhere. This mounting provides for imparting oscillation to the engagement members directly and more efficiently with less weight required to impart a corresponding shaking force. Mounting to the engagement members passes less force through to the harvester chassis, saving in maintenance and also weight requirements. As less force from the shaking mechanisms is passed through to the chassis, the chassis requires less mass to dampen the forces. Therefore, the overall weight of the harvester can be less. The present invention therefore provides a simpler, more efficient harvester requiring lower maintenance than is possible with prior trunk shaker harvesters.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

DETAILED DESCRIPTION OF THE PREFERRED EMBODIMENT

Figure 1:
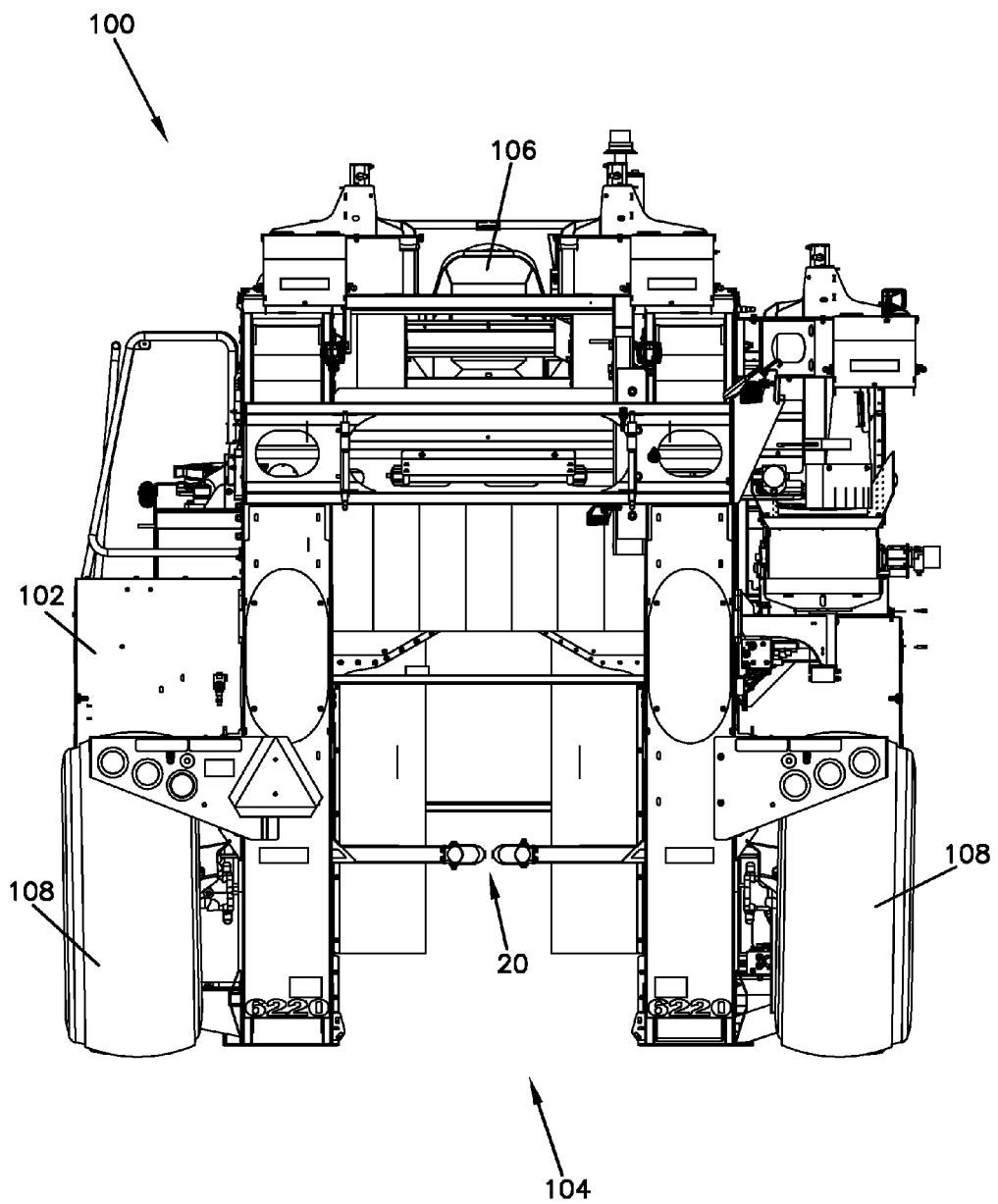
FIG. 1 shows a rear elevational view of an over the row harvester according to the principles of the present invention.

Referring now to the drawings and in particular to FIG. 1, there is shown a harvester (100). The harvester (100) is an over the row harvester driven by a motor and configured for passing over rows of vines, plants or trees. The plants or trees pass through a center tunnel (104) defined by the chassis (102). Such harvesters generally include three or four wheels (108) and include a cab or operator's position (106) typically positioned over the tunnel (104). The over the row harvester as shown is a trunk shaker type harvester in which a shaker assembly (20) engages the trunk of the vine or tree and shakes the vine or tree to loosen fruit, nuts or other crops to be harvested. The collection system includes buckets and conveyors as well as plates or wings beneath the shaker assembly to collect the loosened fruit or crops and transports it to on board storage or other carts or trucks for further processing.

Figure 2:
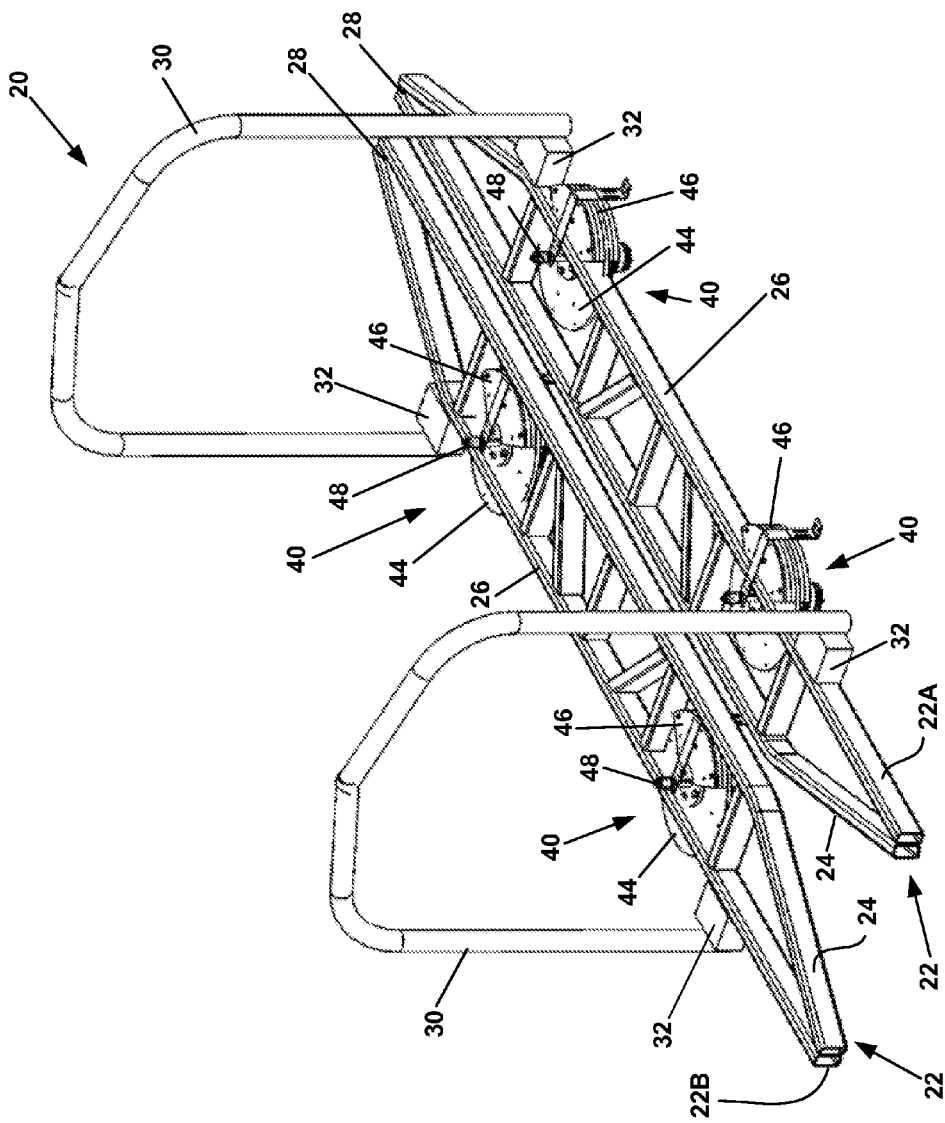
FIG. 2 shows a perspective view of a shaker head assembly for the harvester shown in FIG. 1.
Figure 3:
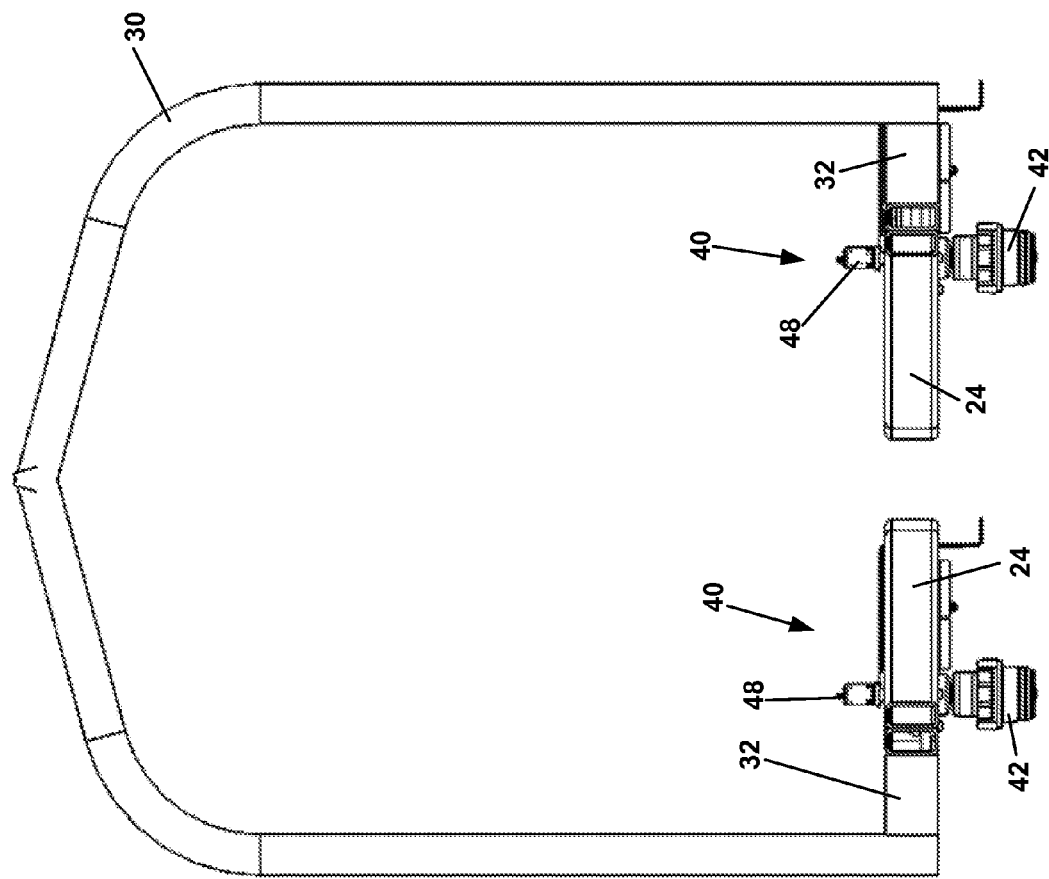
FIG. 3 is a front elevational view of the shaker head assembly shown in FIG. 2.
Figure 4:
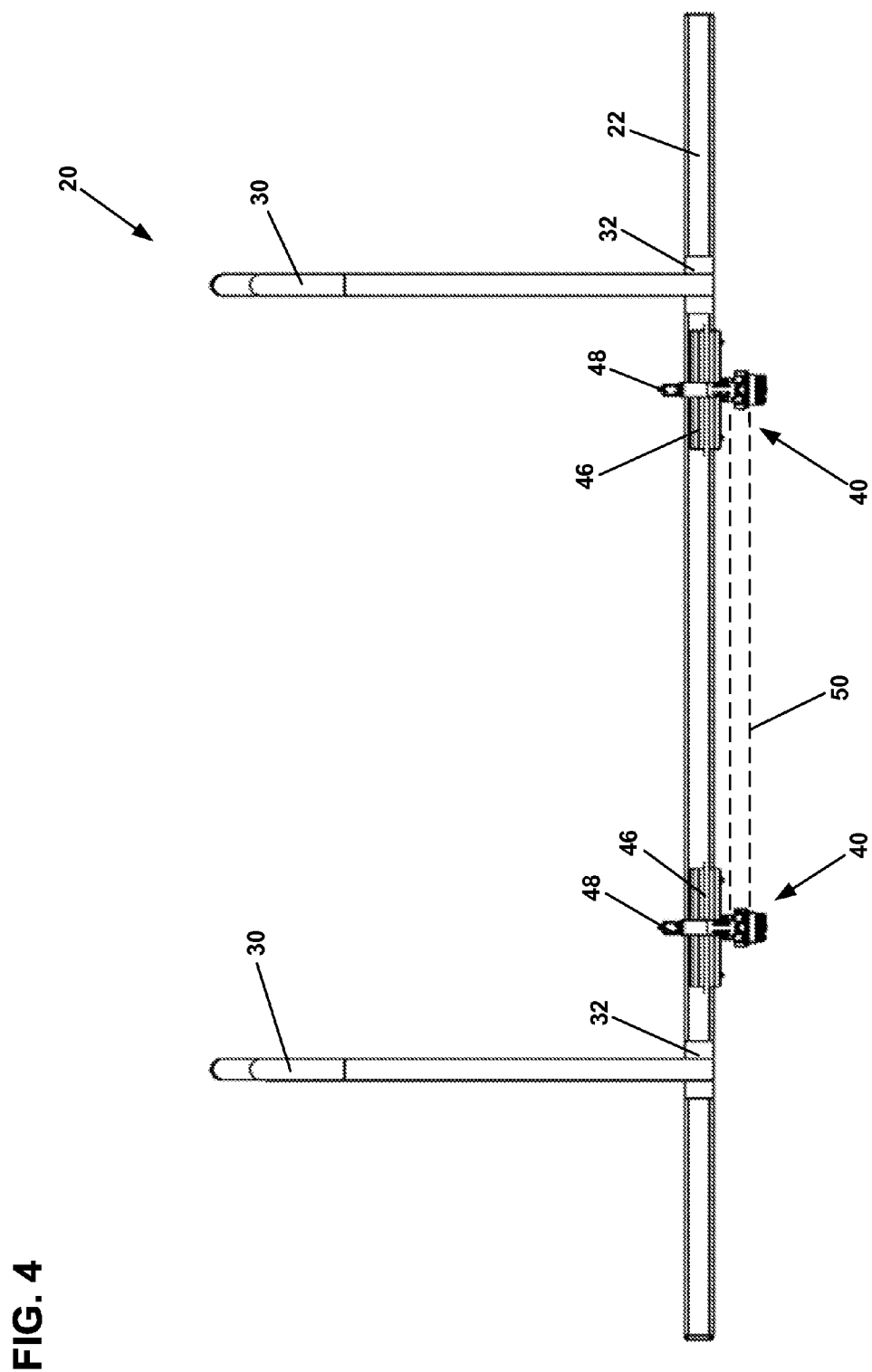
FIG. 4 is a side elevational view of the shaker head assembly shown in FIG. 2.

Referring now to FIGS. 2, 3 and 4, the present invention includes an improved shaker assembly generally designated (20). The shaker assembly (20) includes ski type trunk engagement members (22) including a left engagement member (22A) and a right engagement member (22B). The engagement members (22) are generally aligned along the direction of movement and include left and right engagement members (22A and 22B). The engagement members (22) include divergent entry portions (24) that help to align the shaker assembly (20) relative to the trunk and to guide the trunk between the engagement members (22). A converging exit portion (28) minimizes the space required. In the embodiment shown, the ski type engagement members include a supporting truss type frame structure (26). The shaker assembly (20) is supported on front and rear overhead support arms (30). The engagement members (22) mount to the support arms (30) by isolators (32) that may include dampening materials to aid in isolating or lessening vibration passed through to the harvester chassis.

The shaker (20) includes four drive assemblies (40). The drive assemblies (40) include two drive assemblies (40) for the left engagement member (22A) and two drive assemblies (40) on the right engagement member (22). The drive assemblies (40) each include a motor and a weight or weights and are supported on the frame structure (26) and directly impart shaking forces to the engagement members (22). The drive assemblies (40) may be mounted at or near the same level as the engagement surfaces of the engagement members (22). This configuration results in a geometry in which the drive mechanism imparts shaking forces directly to the engagements members (22) and engagement with the trunk or vine. As a greater percentage of the shaking force is imparted to the engagement members (22), the arrangement provides for lighter weight shaker mechanisms than prior art shaker assemblies mounted an overhead position from the support arms (30) as with is typically done with force balanced shakers.

In one embodiment, each of the drive assemblies (40) includes a motor (42) driving rotary discs (44) about a rotation shaft (48). Each of the drive assemblies (40) includes a stack of weights (46) that are off center on the rotary disk (44). In the embodiment shown, each stack of offset weights is formed as approximately one fourth circles. However, other configurations that achieve shifting mass to impart a shaking force may be used. As the rotary discs (44) rotate, the eccentric weights (46) move around the rotational shaft (48) and impart a force onto the engagement members (22), which impart shaking to the trunk or vine. The motors (42) may have adjustable speeds, but are synchronized between all four drive assemblies (40) so that the forces of the off center weights (46) are synchronized to maximize efficiency for imparting oscillating motion to the engagement members (22). The motors (42) are independently driven but controlled by software to be electronically synchronized to maintain the coordinated synchronized motions of the weights (46) between the drive assemblies (40). In one embodiment, the shaft (48) includes an encoder that measures the angular position. Conventional encoders are available that are accurate to within $1/4096^{th}$ of a revolution to maintain synchronized motion. The drive assemblies (40) are synchronized so that the lateral position of the weights (46) is the same for all four drive assemblies (40). However, the front and rear drive assemblies (40) for each of the left and right engagement members (22A and 22B) rotate in an opposite direction. Therefore, the front and rear drive assemblies (40) on each side have their weights oriented to offset longitudinal forces. However, the drive assemblies are synchronized so that the lateral positions are aligned and impart the lateral oscillating motion to the engagement members to shake the trunk or vines.

Although each of the drive assemblies (40) may include a dedicated motor (42), the two sets of eccentric weights (46) on each side could also be driven by a single motor (42). A drive train (50) such as shown in dashed lines in FIG. 4 may be utilized having a combination of belts, chains and/or gears that rotates the front and rear weights at the same speed, but in opposite directions. The motor (42) of one of the assemblies (40) may directly drive one set of weights (46) and drive the other set of weights (46) through the drive train (50).

Figure 5:
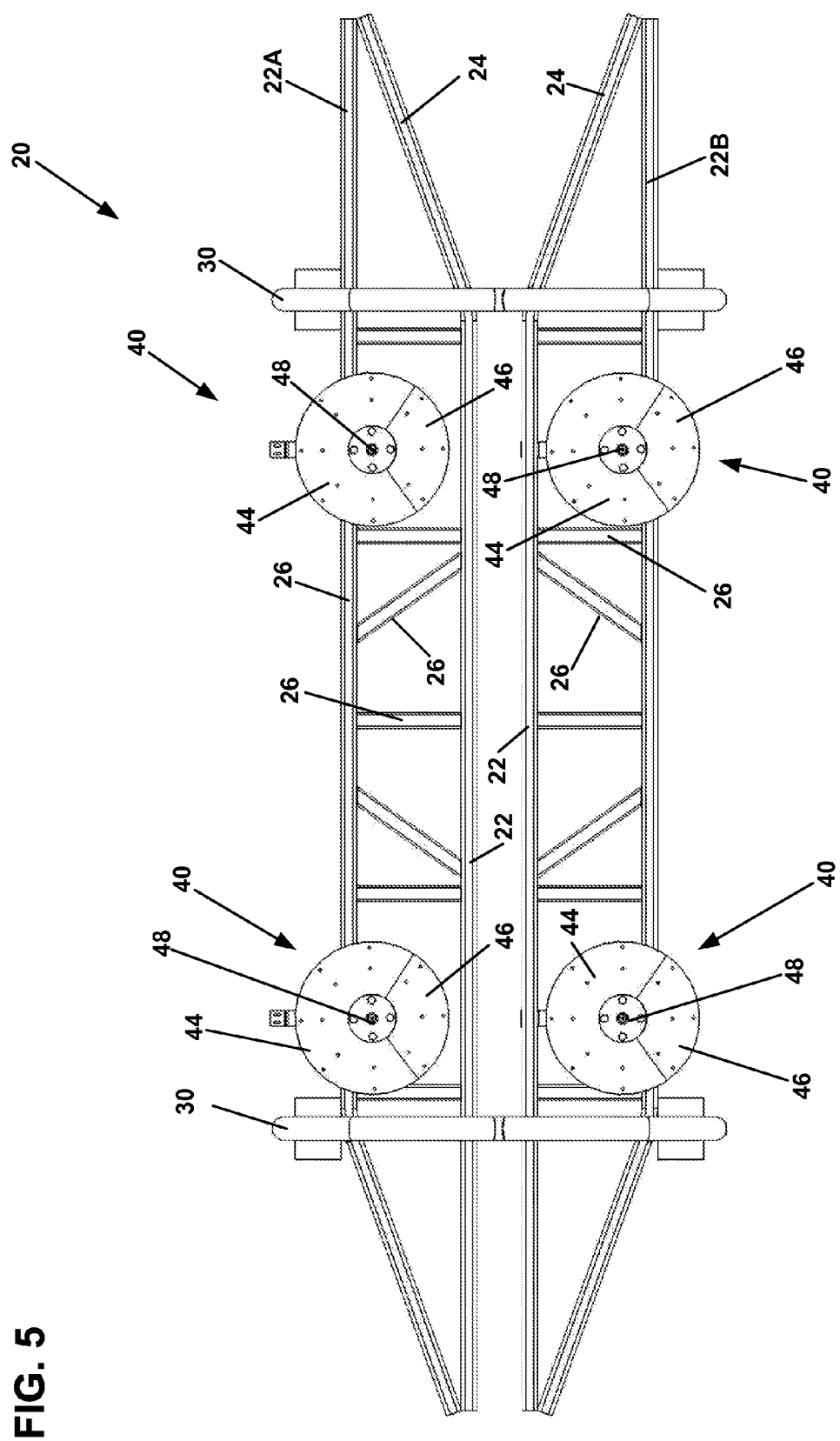
FIG. 5 is a top plan view of the shaker head assembly shown in FIG. 2 with the weights at a first rotary position.
Figure 6:
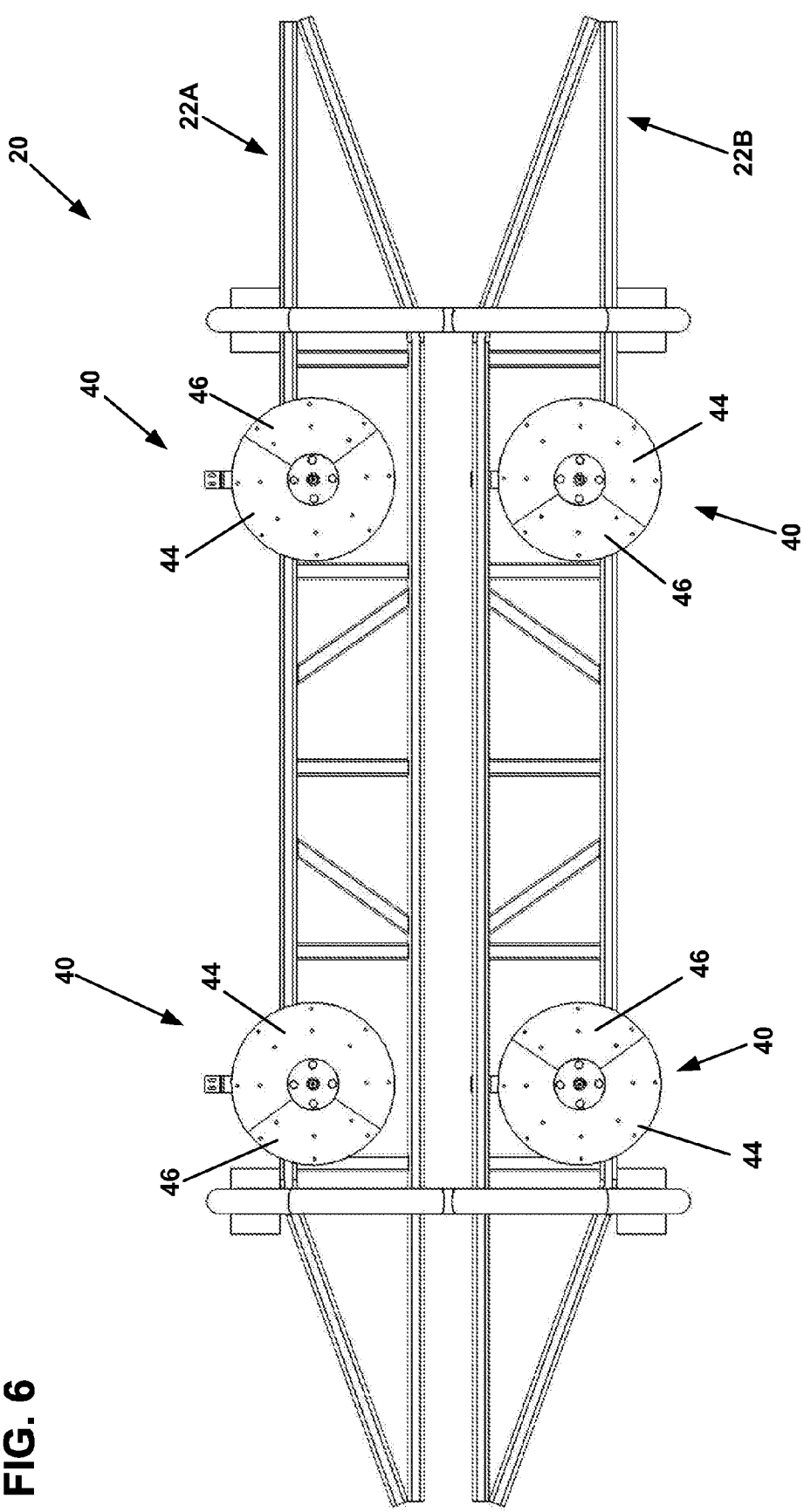
FIG. 6 is a top plan view of the shaker head assembly shown in FIG. 5 with the weights at a second rotary position with the weights rotated 90° from the position shown in FIG. 5.

Referring now to FIGS. 5-8, the motion and relative positions of the synchronized drive assemblies (40) are shown. In FIG. 5, the drive assemblies (40) are positioned with the weights (46) at their right most position (downward in FIG. 5). All four of the drive assemblies (40) are synchronized at the same angular position. However, as the rotary discs (44) rotate 90° as shown in FIG. 6, the weights (46) are opposed between the front and rear drive assemblies on each side. The weights (46) for the drive assemblies (40) on the left engagement member (22A) (at the top of FIG. 6), are laterally centered but extend away from one another and provide opposite cancelling forces. The drive assemblies (40) for the right engagement member (22) (the bottom of FIG. 6) are longitudinally aligned but are directed toward one another. Therefore, the longitudinal forces due to the weights (46) cancel one another and are absorbed by the frame (26) of each of the engagement members (22).

Figure 7:
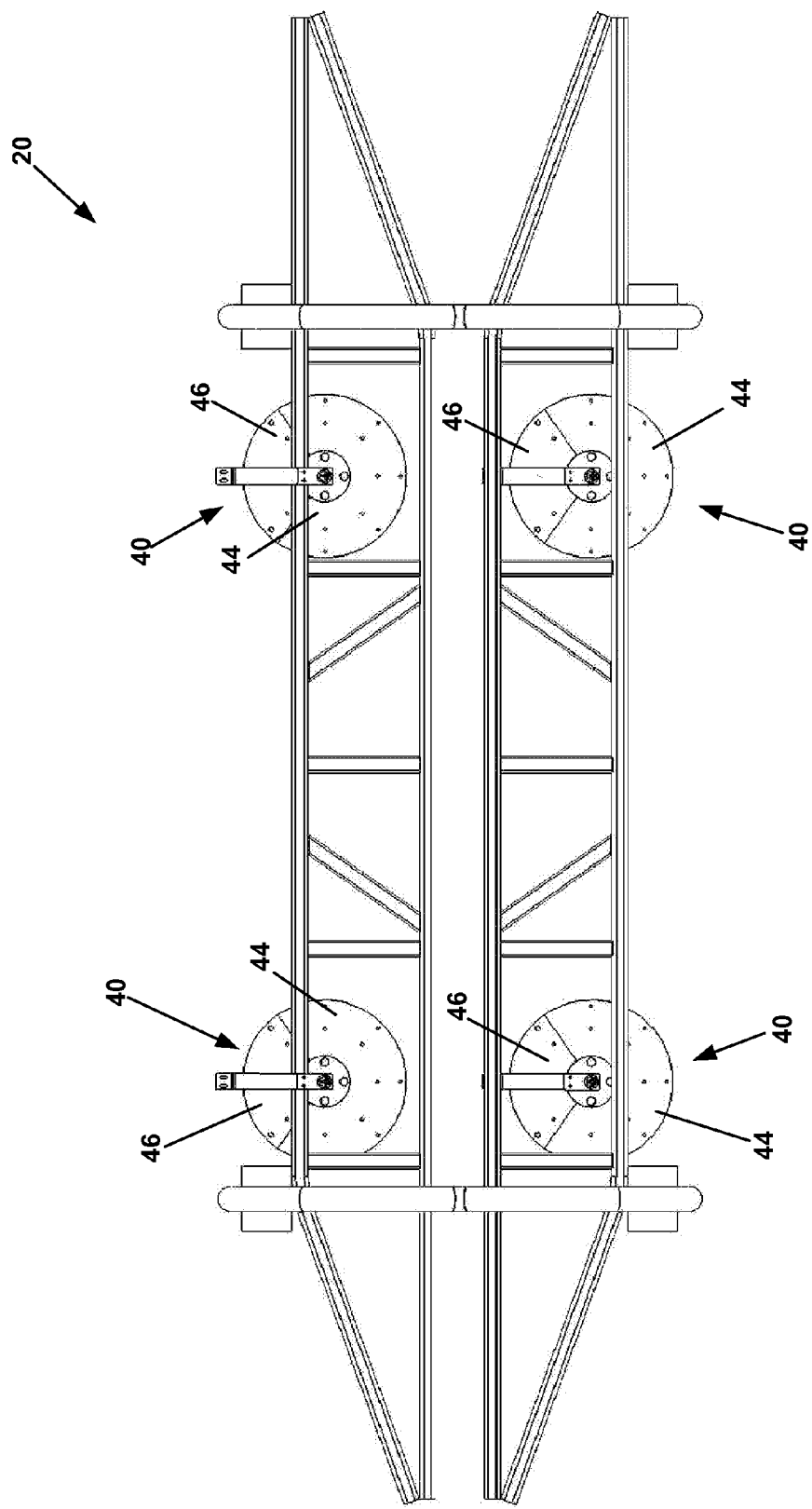
FIG. 7 is a top plan view of the shaker head assembly shown in FIG. 5 with the weights at a third rotary position with the weights rotated 180° from the position shown in FIG. 5.

As the discs (44) rotate 90° further, they reach the position shown in FIG. 7. As shown in FIG. 7, all weights are directed to the left or top side of the shaker assembly (20) and all drive assemblies (40) have the weights (46) synchronized and aligned.

Figure 8:
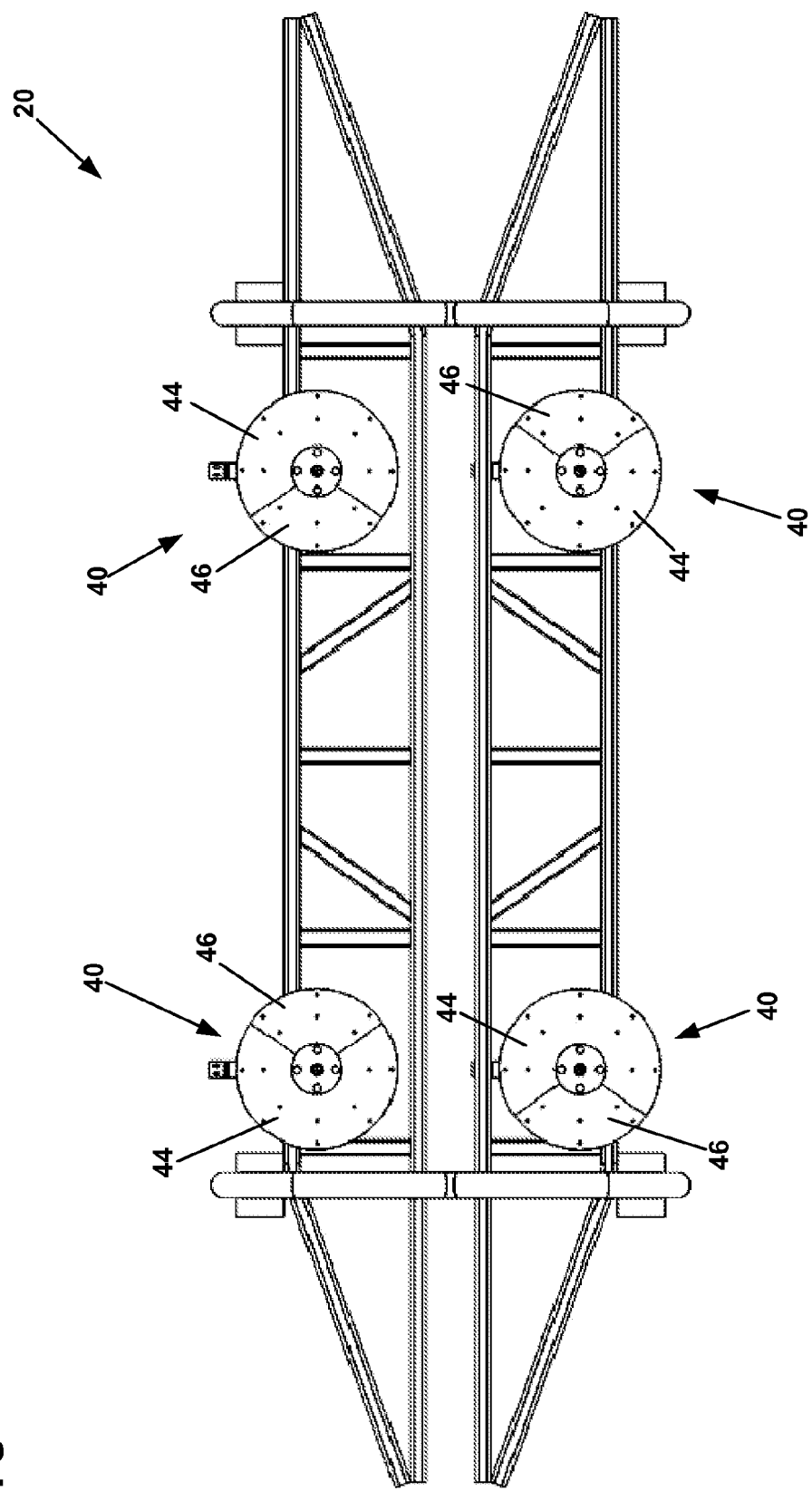
FIG. 8 is a top plan view of the shaker head assembly shown in FIG. 5 with the weights at a fourth rotary position with the weights rotated 270° from the position shown in FIG. 5.

Finally, as shown in FIG. 8, the drive assemblies (40) have the rotary discs (46) rotated a further 90°, or 270° from the original position shown in FIG. 5. The off center weights (46) are again longitudinally aligned with the weights (46) extending toward one another on the left side of the shaker assembly (20). The weights (46) on the right side of the shaker assembly (20) extend away from one another. Although the weights (46) cancel forces from each other on each side, the positions on each side are opposite the positions of FIG. 6. Therefore, the forces cancel out and are absorbed through the frame structures (26). A further rotation of 90° returns to the position shown in FIG. 5.

It can be appreciated that with the motors (42) synchronized and the rotary positions aligned, the forces and torques cancel out in the longitudinal front and rear directions as the counter rotation of the drive assemblies (40) on each side of the shaker assembly (20) cancel one another. Moreover, the forces between the left and right side are opposite in the front and rear direction. However, all four of the drive assemblies have the weights (46) extending either to the left or right side at the same time to impart a desired lateral motion to the shaker assembly (20).

With the drive assemblies and weights positioned at the engagement members (22), less weight is needed. Moreover, as less weight is needed at the shaker assembly (20), the structure needed to support and absorb the forces utilized may be less robust, providing further weight savings and greater efficiencies over the prior art. Therefore, the shaker assembly (20) of the present invention further provides for a harvester (100) having a substantially lighter weight and greater efficiency. Moreover, although less weight is utilized, the same effective shaking force may be transmitted using a lighter weight and more efficient shaker assembly (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A shaker apparatus comprising:
   a shaker head configured to engage plants, the shaker head including a left engagement assembly and a right engagement assembly configured to pass on opposite sides of plants;
   a drive system imparting motion to the shaker head; the drive system comprising:
   a plurality of motor and weight assemblies, each of the motor and weight assemblies including an eccentric weight and an associated motor driving the weight; the motors of the plurality of motor and weight assemblies being synchronized;
   each of the left and right engagement assemblies is driven by two associated motor and weight assemblies including a front motor and weight assembly and a rear motor and weight assembly.

2. A shaker apparatus according to claim 1, wherein the front motor and weight assembly of each side is driven in an opposite direction as the rear motor and weight assembly.

3. A shaker apparatus according to claim 1, wherein the front motor and weight assembly of the left side rotates in an opposite direction to the front motor and weight assembly of the right side.

4. A shaker apparatus according to claim 2, wherein the front motor and weight assembly of the left side rotates in an opposite direction to the front motor and weight assembly of the right side.

5. An over the row shaker apparatus comprising:
   a shaker head configured to engage plants, the shaker head including a left engagement assembly and a right engagement assembly configured to pass on opposite sides of plants;
   a drive system imparting motion to the shaker head; the drive system comprising:
   a plurality of motor and weight assemblies, each of the motor and weight assemblies including an eccentric weight and an associated motor driving the weight; the motors of the plurality of motor and weight assemblies being synchronized:
   overhead support arms supporting the left and right engagement assemblies, two of the motor and weight assemblies being mounted to the left engagement assembly and another two of the motor and weight assemblies being mounted to the right engagement assembly.

6. A shaker apparatus, comprising:
   a shaker head configured to engage plants, the shaker head including a left engagement assembly and a right engagement assembly configured to pass on opposite sides of plants;
   a drive system imparting motion to the shaker head; the drive system comprising:
   a plurality of motor and weight assemblies, each of the motor and weight assemblies including an eccentric weight and an associated motor driving the weight;
   a synchronization system synchronizing the motors of the plurality of motor and weight assemblies;
   each of the engagement assemblies comprising a truss structure, the motor and weight assemblies being mounted on the truss structure.

7. An over the row harvester, comprising:
   a chassis defining a tunnel for plants to pass through;
   a shaker head configured to engage plants in the tunnel, the shaker head including a left engagement assembly and a right engagement assembly configured to pass on opposite sides of plants, the shaker head comprising overhead support arms supporting the left and right engagement assemblies;
   a drive system imparting motion to the shaker head; the drive system comprising:
   a plurality of motor and weight assemblies, each of the motor and weight assemblies including an eccentric weight and an associated motor driving the weight; the motors of the plurality of motor and weight assemblies being synchronized; at least two of the motor and weight assemblies being mounted to the left engagement assembly and at least two of the motor and weight assemblies being mounted to the right engagement assembly.

8. A harvester according to claim 7, wherein the left and right engagement assemblies each include a frame, and wherein the motor and weight assemblies mount to the frame of each of the engagement assemblies.

* * * * *